(12) United States Patent
Lee et al.

(10) Patent No.: US 9,010,948 B2
(45) Date of Patent: Apr. 21, 2015

(54) PHOTOGRAPHY LIGHTING FIXTURE

(71) Applicant: Global Fiberoptics, Inc., Kaohsiung (TW)

(72) Inventors: Ho-Shang Lee, El Sobrante, CA (US); Jui-Hung Cheng, Kaohsiung (TW); Hui-Hsiung Kuo, Kaohsiung (TW); Hsiang-Yu Lee, Kaohsiung (TW)

(73) Assignee: Global Fiberoptics, Inc., Kaohsiung (TW)

( * ) Notice: Subject to any disclaimer, the term of this patent is extended or adjusted under 35 U.S.C. 154(b) by 0 days.

(21) Appl. No.: 14/041,525

(22) Filed: Sep. 30, 2013

(65) Prior Publication Data

US 2014/0293572 A1   Oct. 2, 2014

(30) Foreign Application Priority Data

Mar. 26, 2013   (TW) .............................. 102110662 A

(51) Int. Cl.
*G03B 15/06*   (2006.01)

(52) U.S. Cl.
CPC ..................................... *G03B 15/06* (2013.01)

(58) Field of Classification Search
USPC ............. 362/16, 18, 277, 280, 282, 283, 319, 362/322, 323, 351, 354, 360
See application file for complete search history.

(56) References Cited

U.S. PATENT DOCUMENTS

| | | | | |
|---|---|---|---|---|
| 3,140,053 | A | * | 7/1964 | Lowell ............................ 362/18 |
| 3,643,079 | A | * | 2/1972 | Glickman ................ 362/249.09 |
| 3,783,264 | A | * | 1/1974 | Hamilton et al. ............. 362/283 |
| 4,179,726 | A | * | 12/1979 | Aron ............................... 362/17 |
| 4,719,545 | A | * | 1/1988 | Cano ............................. 362/240 |
| 4,777,566 | A | * | 10/1988 | Lowell et al. ...................... 362/3 |
| 5,432,683 | A | * | 7/1995 | Brown ............................ 362/16 |
| 5,921,662 | A | * | 7/1999 | Bruckner et al. ............. 362/292 |
| 8,070,338 | B2 | * | 12/2011 | Boroczki et al. ............. 362/512 |

* cited by examiner

*Primary Examiner* — Laura Tso
(74) *Attorney, Agent, or Firm* — Pearl Cohen Zedek Latzer Baratz LLP

(57) ABSTRACT

A photography lighting fixture includes a lighting device and a shade device. The lighting device includes a housing, a lighting element disposed in the housing, and a first attaching unit connected to the housing. The shade device includes a base mount, a plurality of shade components mounted pivotally to the base mount, and a second attaching unit mounted to the base mount and detachably and rotatably attaching the first attaching unit.

4 Claims, 17 Drawing Sheets

PHOTOGRAPHY LIGHTING FIXTURE

CROSS-REFERENCE TO RELATED APPLICATION

This application claims priority of Taiwanese Application No. 102110662, filed on Mar. 26, 2013.

BACKGROUND OF THE INVENTION

1. Field of the Invention

The invention relates to a lighting fixture, more particularly to a photography lighting fixture.

2. Description of the Related Art

Referring to FIG. 1, a conventional photography lighting fixture 1 includes a housing 11, a lighting element (not shown) disposed in the housing 11, and a plurality of shade components 12 pivotally mounted to the housing 11. By pivoting the shade components 12 relative to the housing 11, light emitted from the lighting element can be directed, and the amount of the light illuminated on an object can be adjusted. However, since the shade components 12 are directly mounted to the housing 11, it is inconvenient to replace the shade components with those having a different shape. Further, the adjusting extent of the illumination area of the lighting element is limited to a relatively small range.

SUMMARY OF THE INVENTION

The object of the present invention is to provide a photography lighting fixture having a shade device that is detachable and rotatable relative to a lighting device and providing a relatively large adjusting extent of illumination area.

According to the present invention, there is provided a photography lighting fixture including a lighting device and a shade device. The lighting device includes a housing, a lighting element disposed in the housing, and a first attaching unit connected to the housing. The shade device includes a base mount, a plurality of shade components mounted pivotally to the base mount, and a second attaching unit mounted to the base mount and detachably and rotatably attaching the first attaching unit. The shade components are configured to direct light emitted from the lighting element when the shade device is mounted to the lighting device via the first and second attaching units.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
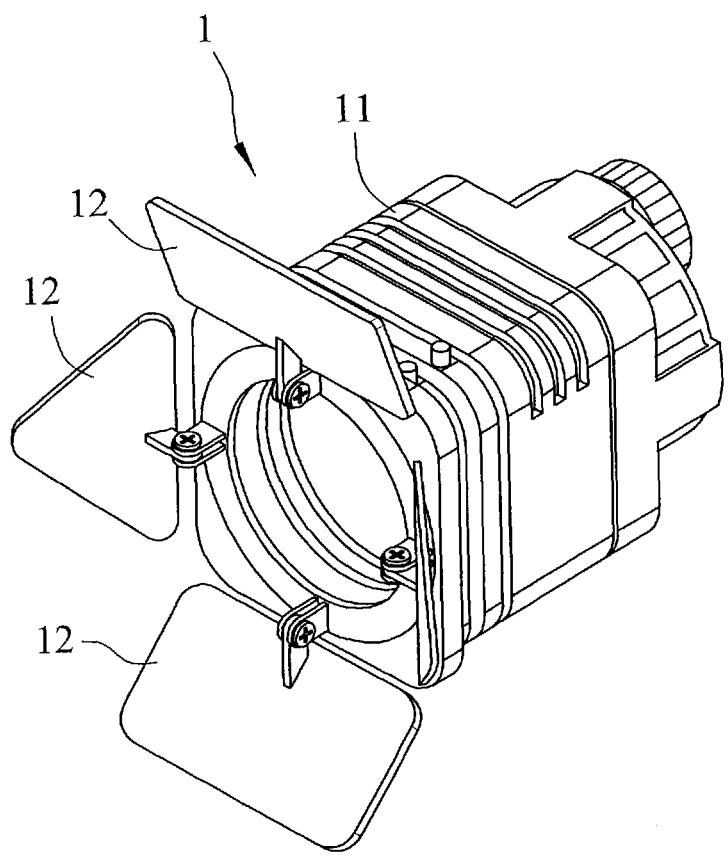
FIG. 1 is a perspective view of a conventional photography lighting fixture.
Figure 2:
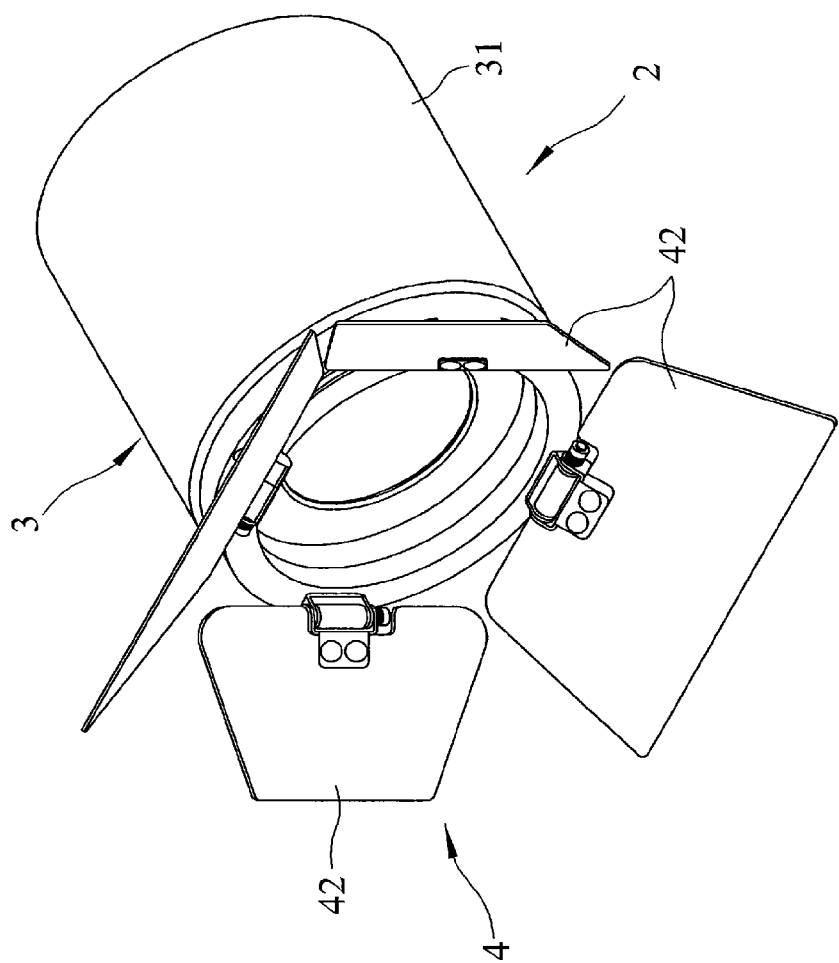
FIG. 2 is a perspective view of a preferred embodiment of a photography lighting fixture according to the present invention and an object to be illuminated by the photography lighting fixture.
Figure 2:
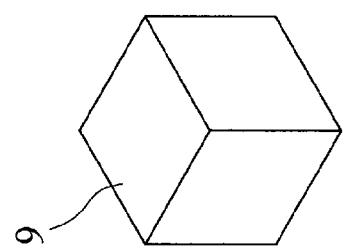
Figure 3:
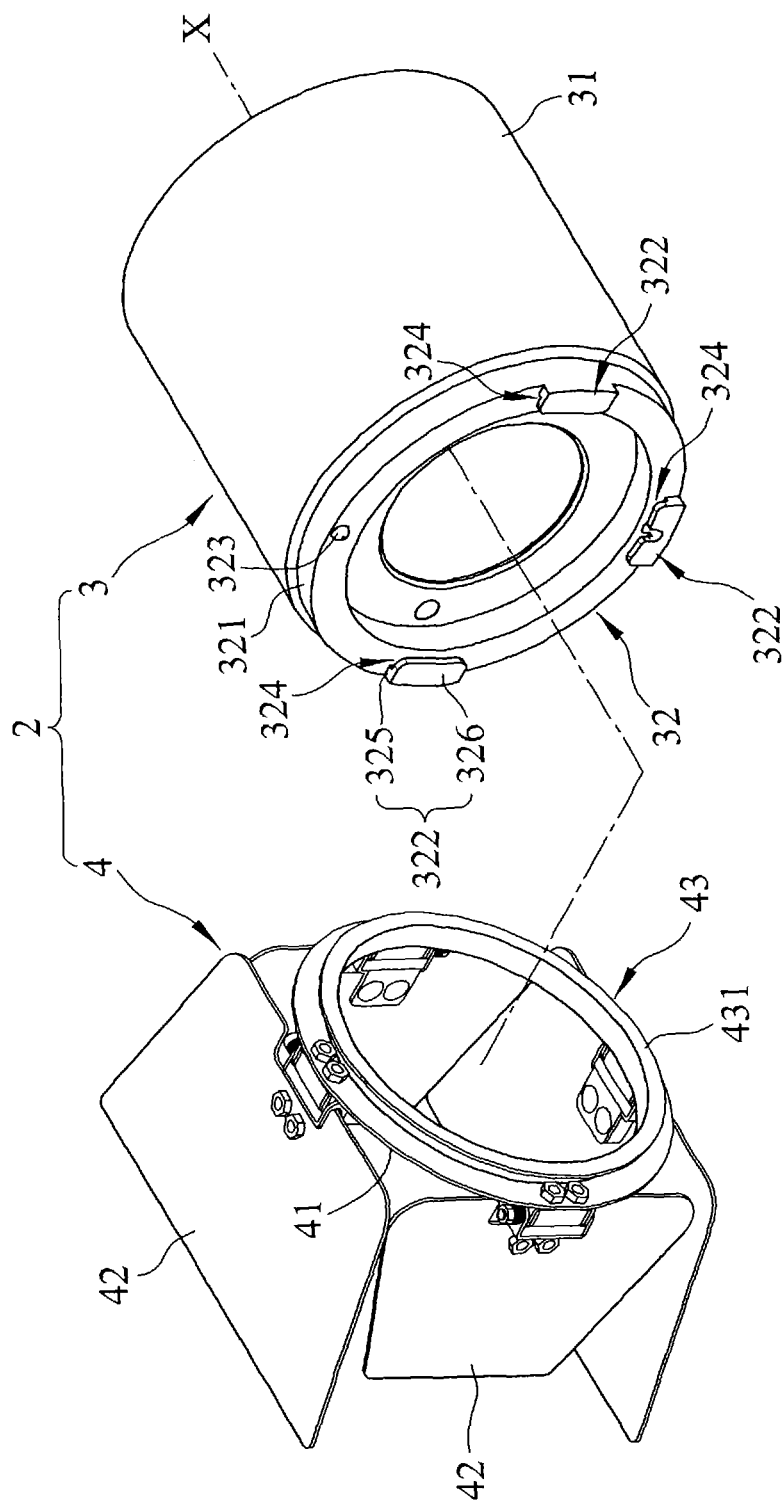
FIG. 3 is a partly exploded perspective view of the preferred embodiment, illustrating a lighting device and a shade device of the photography lighting fixture.
Figure 4:
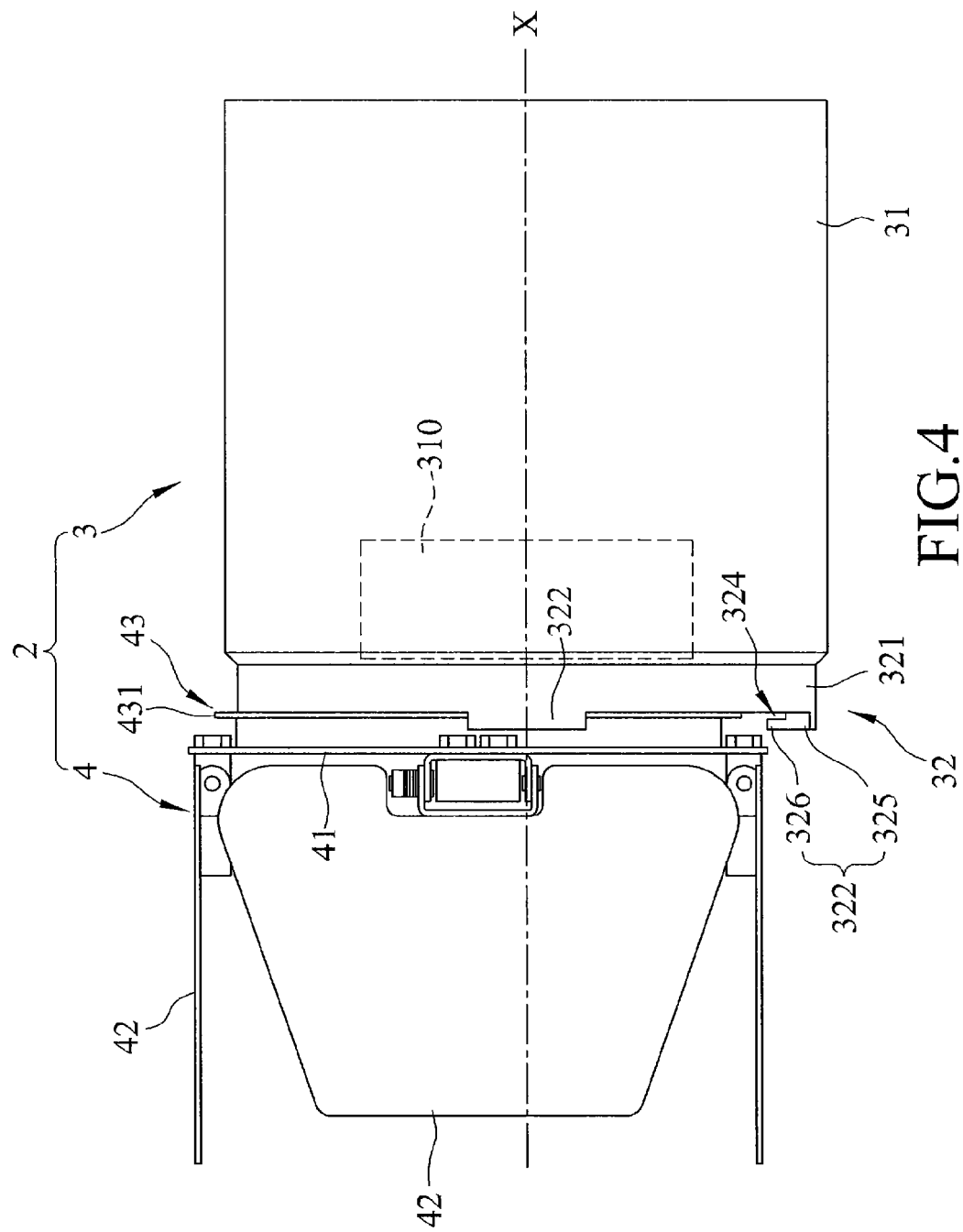
FIG. 4 is a schematic side view of the preferred embodiment, illustrating the lighting device and the shade device being separated from each other.

Referring to FIGS. 2 to 4, the preferred embodiment of the photography lighting fixture 2 according to the present invention is shown to include a lighting device 3 and a shade device 4.

The lighting device 3 includes a housing 31 surrounding an axis (X), a lighting element 310 disposed in the housing 31 for illuminating an object 9, and a first attaching unit 32 connected to the housing 31. Preferably, the lighting element 310 is an LED, and the color and the luminosity of the lighting element 310 can be changed. Further, the photography lighting fixture 2 may be secured to a tripod (not shown) by the housing 31. Since the feature of this invention does not reside in means for securing the photography lighting fixture 2 to the tripod, further details of the same are omitted herein for the sake of brevity.

In this embodiment, the first attaching unit 32 includes an annular main body 321 connected to the housing 31 and surrounding the axis (X), a plurality of angularly spaced-apart limiting members 322 connected to the main body 321, and a positioning member 323. Each of the limiting members 322 has a connecting segment 325 extending from the main body 321 in the direction of the axis (X) away from the housing 31, and an extending segment 326 extending radially and inwardly from a distal end of the connecting segment 325 and cooperating with the main body 321 to define a limiting space 324 therebetween.

The shade device 4 includes a base mount 41, a plurality of angularly spaced-apart shade components 42 mounted pivotally to the base mount 41, and a second attaching unit 43 mounted to the base mount 41. The second attaching unit 43 includes an engaging ring 431 extending radially and outwardly from a periphery of the base mount 41 and engaging detachably and rotatably the limiting spaces 324 defined between the main body 321 and the limiting members 322. The shade components 42 are configured to direct light emitted from the lighting element 310 when the shade device 4 is mounted to the lighting device 3 via the first and second attaching units 32, 43.

Figure 5:
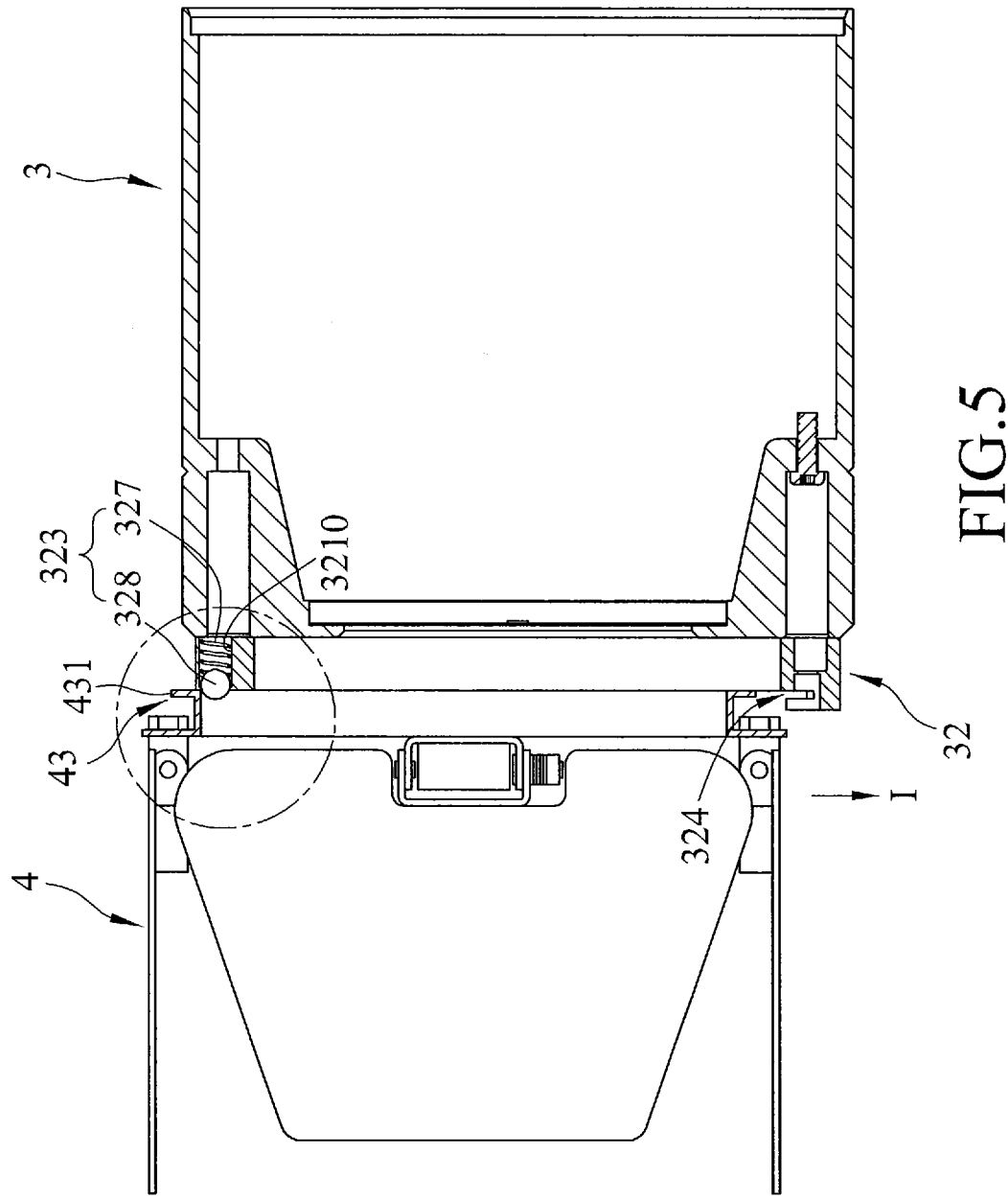
FIG. 5 is a partly sectional view of the preferred embodiment, illustrating the lighting device and the shade device being separated from each other.
Figure 6:
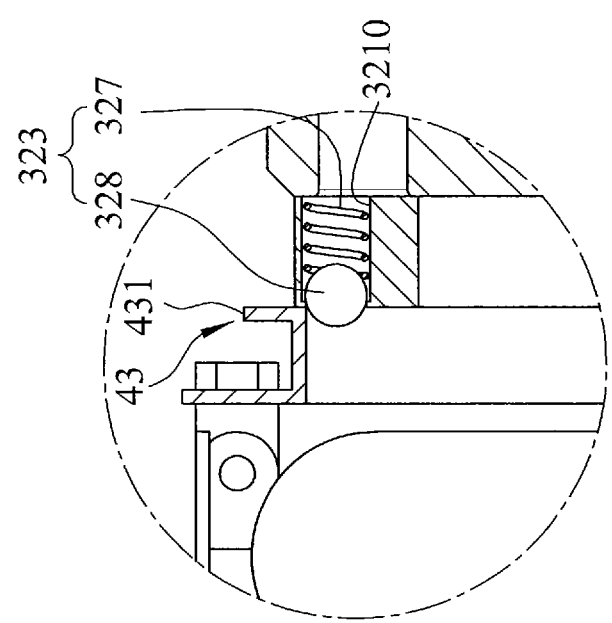
FIG. 6 is a fragmentary enlarged view of an encircled portion in FIG. 5.

Further referring to FIGS. 5 and 6, the main body 321 of the first attaching unit 32 is formed with a receiving hole 3210 extending in the direction of the axis (X). The positioning member 323 includes a resilient portion 327 disposed in the receiving hole 3210, and a movable portion 328 connected to the resilient portion 327. In this embodiment, the resilient portion 327 is a compression spring and the movable portion 328 is a ball, but the invention is not limited in this respect. The movable portion 327 is resiliently movable between a limiting position (see FIG. 9), where the movable portion 328 is biased by the resilient portion 327 to protrude outwardly of the receiving hole 3210 for positioning the second attaching unit 43 relative to the first attaching unit 32, and a retracted position (see FIGS. 7 and 8), where the resilient portion 327 is compressed resiliently and the movable portion 328 is retracted into the receiving hole 3210 such that the second attaching unit 43 is permitted to be disengaged from the limiting spaces 324.

Figure 7:
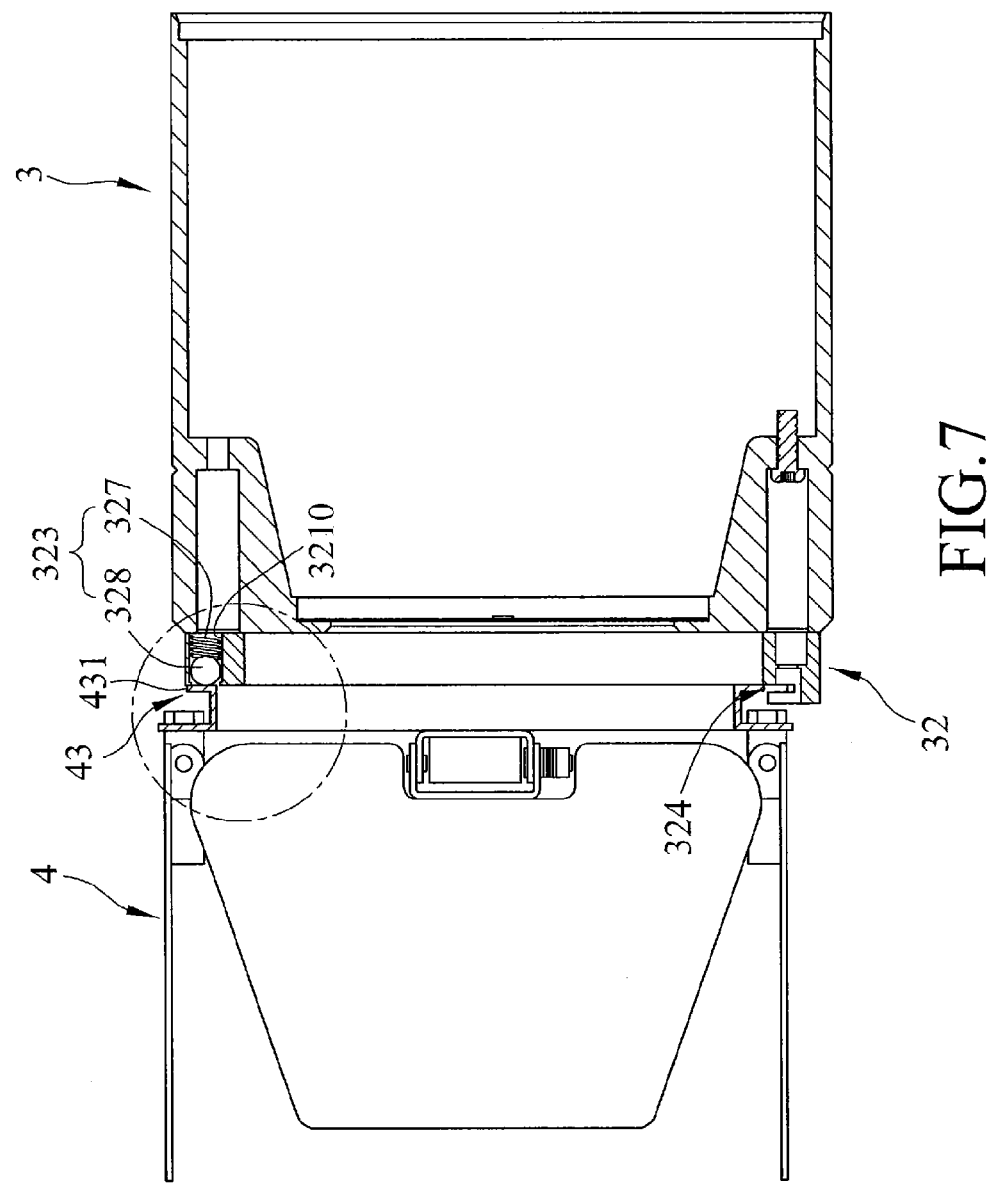
FIG. 7 is a partly sectional view of the preferred embodiment, illustrating an engaging ring of the shade device abutting against a movable portion of a positioning member.
Figure 8:
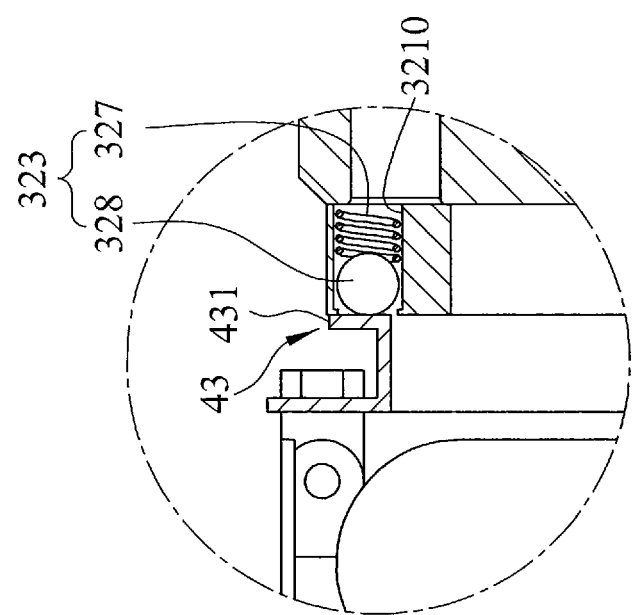
FIG. 8 is a fragmentary enlarged view of an encircled portion in FIG. 7.
Figure 9:
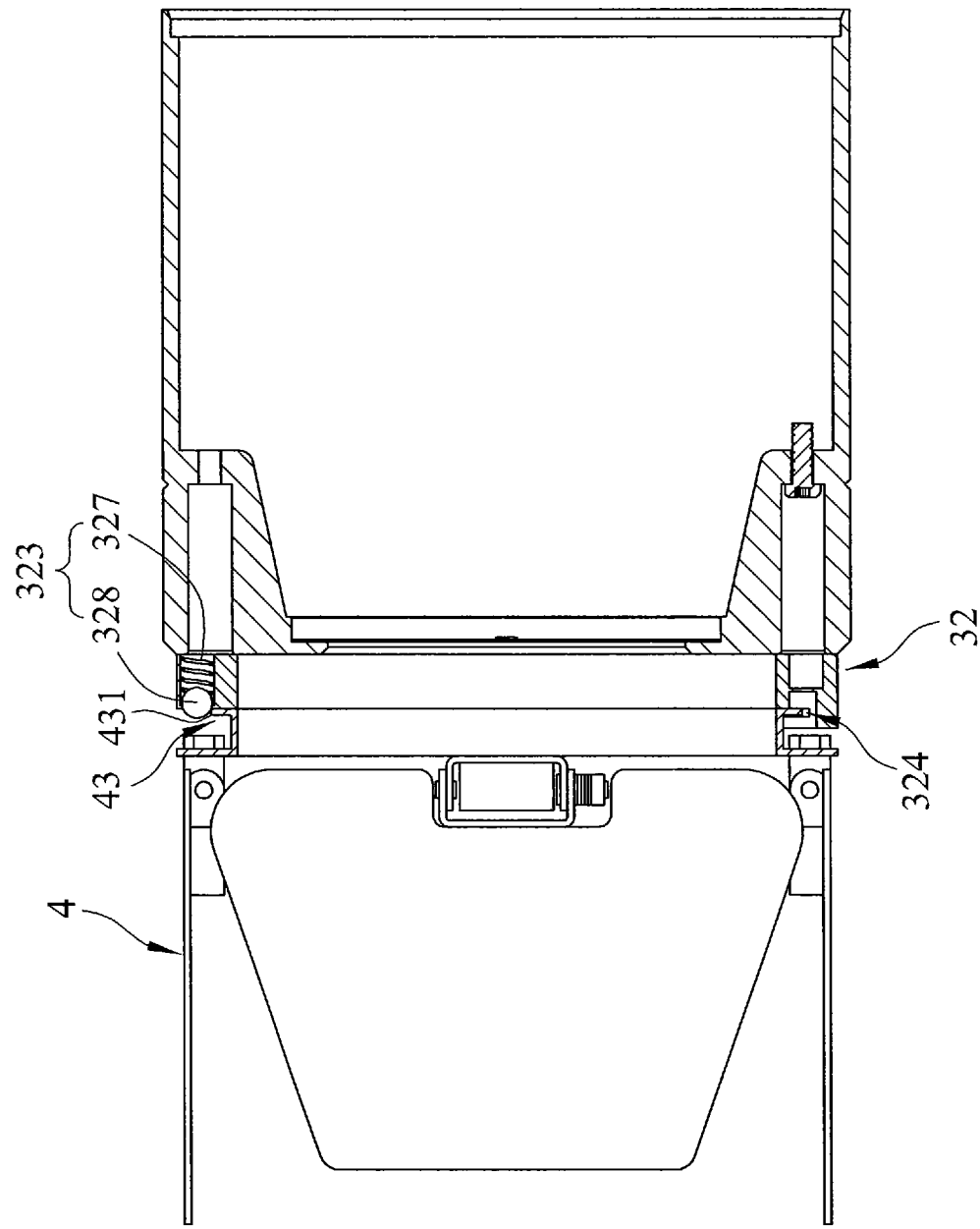
FIG. 9 is a partly sectional view of the preferred embodiment, illustrating the shade device attached to the lighting device and the movable portion at a limiting position so as to position the shade device relative to the lighting device.

When the shade device 4 is to be assembled to the lighting device 3, as shown in FIGS. 5 and 6, the engaging ring 431 of the second attaching unit 43 is first placed at a position slightly misaligned with the first attaching unit 32 due to the movable portion 328 of the positioning member 323 being at the limiting position. As shown in FIGS. 7 and 8, since the engaging ring 431 abuts against the movable portion 328 of the positioning member 323, a force is then exerted on the engaging ring 431 in a direction (I) (see FIG. 5) relative to the lighting device 3 to retract the movable portion 328 into the receiving hole 3210 against the resilient force of the resilient portion 326 of the positioning member 323. Thereafter, the engaging ring 431 is permitted to be moved in the direction (I) to engage the limiting spaces 324 and pass over the positioning member 323, such that the movable portion 328 is biased outwardly of the receiving hole 3210 by a restoring force of the resilient portion 327 back to the limiting position (see FIG. 9), and the first attaching unit 32 would be positioned relative to the second attaching unit 43 by the positioning member 323. When it is desired to detach the shade device 4 from the lighting device 3, a force is exerted on the shade device 4 in a direction opposite to the direction (I) relative to the lighting device 3 sufficient to bias the movable portion 328 to the retracted position so as to detach the second attaching unit 43 from the first attaching unit 32.

Figure 10:
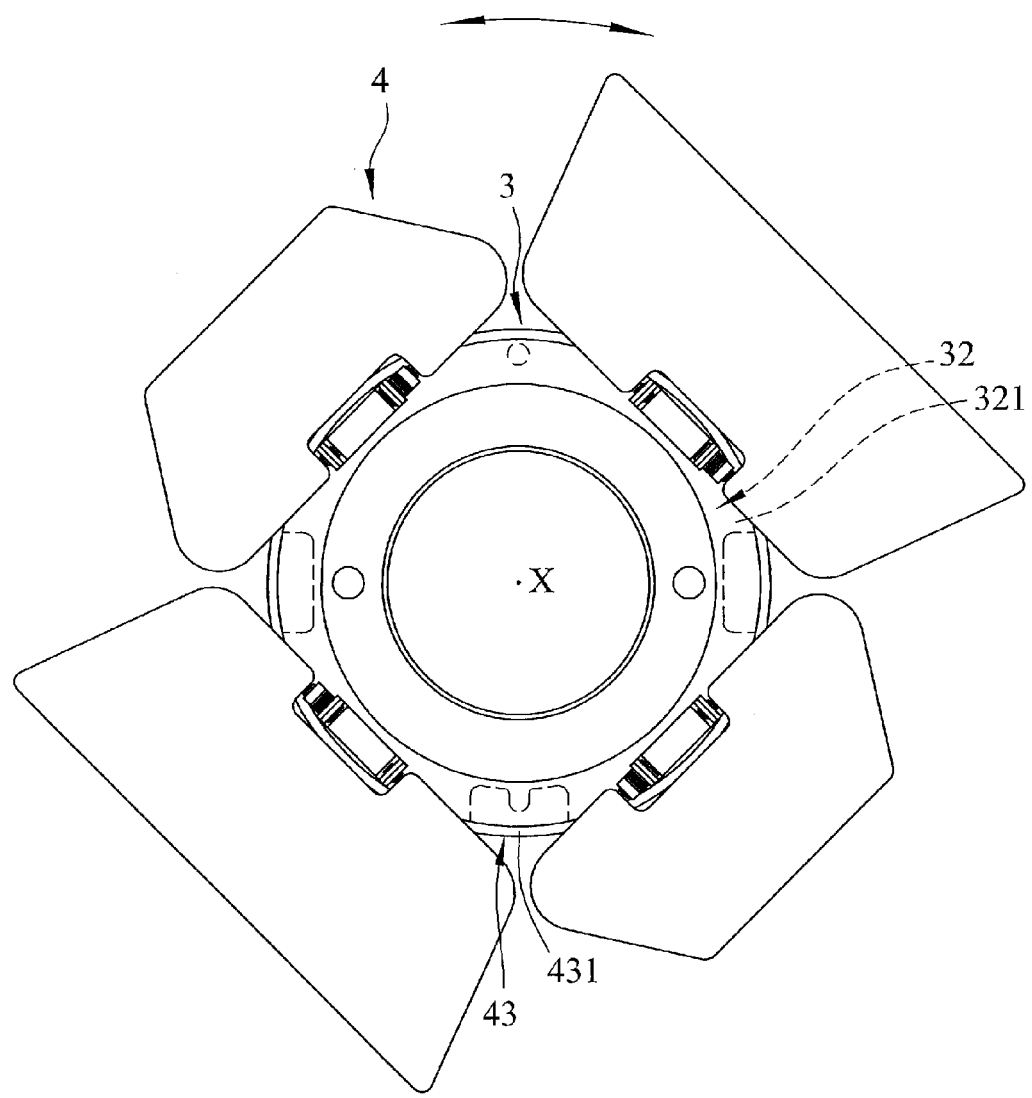
FIG. 10 is a front view of the preferred embodiment.
Figure 11:
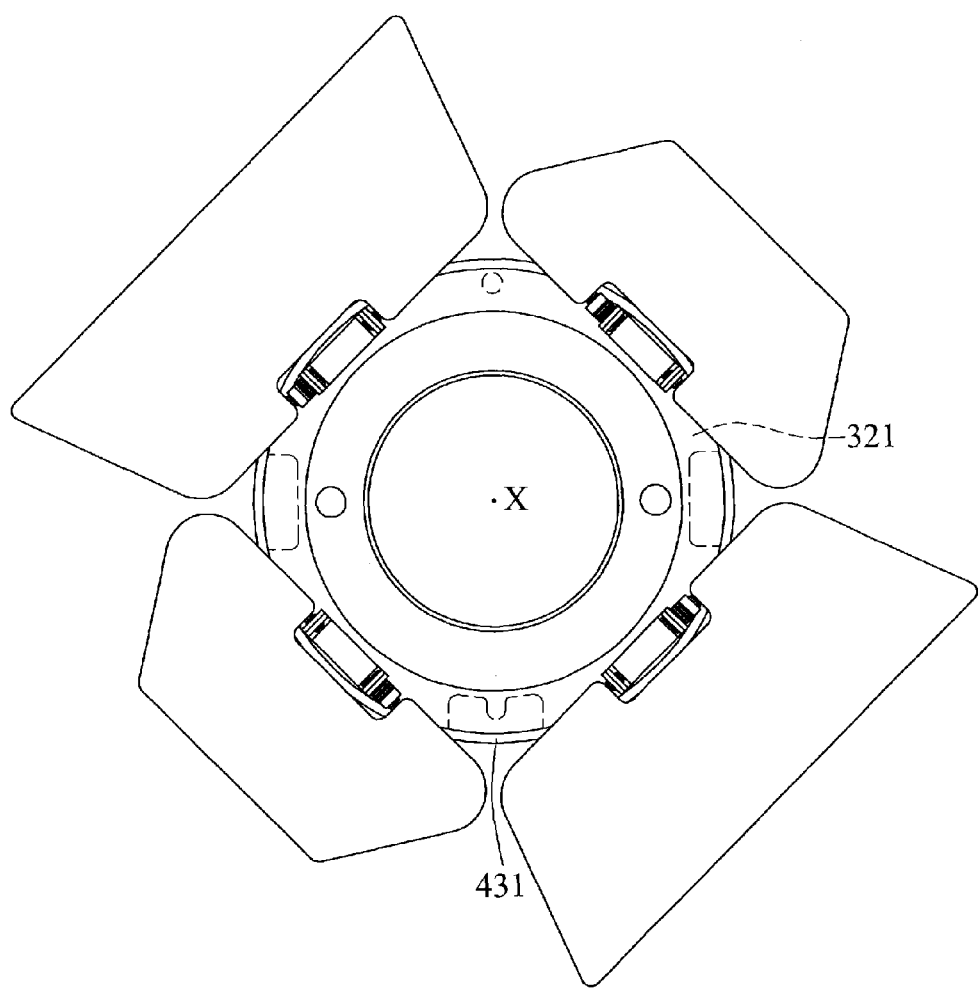
FIG. 11 is another front view of the preferred embodiment, illustrating the shade device being rotated relative to the lighting device.

As shown in FIGS. 10 and 11, since the main body 321 of the first attaching unit 32 and the engaging ring 431 of the second attaching unit 43 are both annular, the shade device 4 can rotate relative to the lighting device 3 about the axis (X) when attached to the lighting device 3. When the photography lighting fixture 2 accidently falls down from the tripod and is subjected to a collision, the shade device 4 may rotate relative to or even be detached from the lighting device 3 so as to prevent severe damage to the shade components 42.

Figure 12:
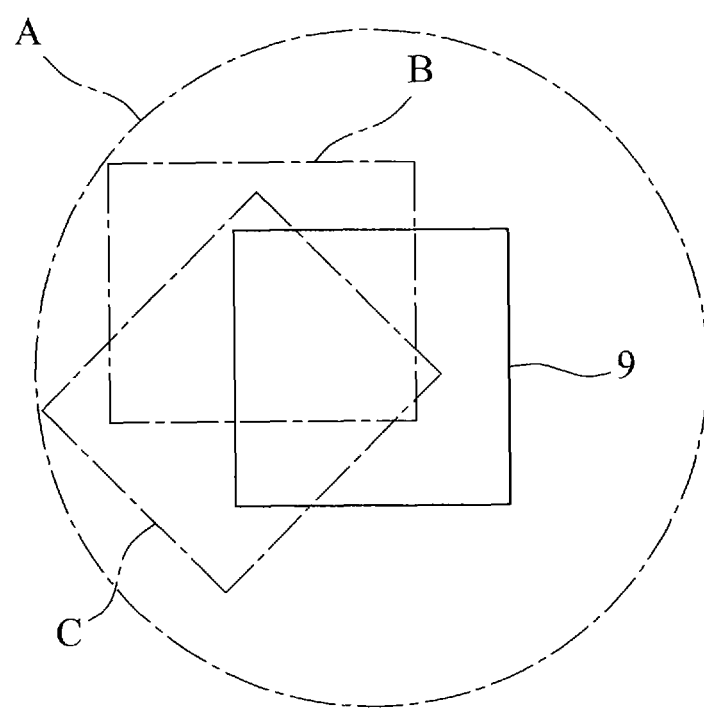
FIG. 12 is a schematic view of different illumination areas of the lighting device corresponding to different operations of the shade device.
Figure 13:
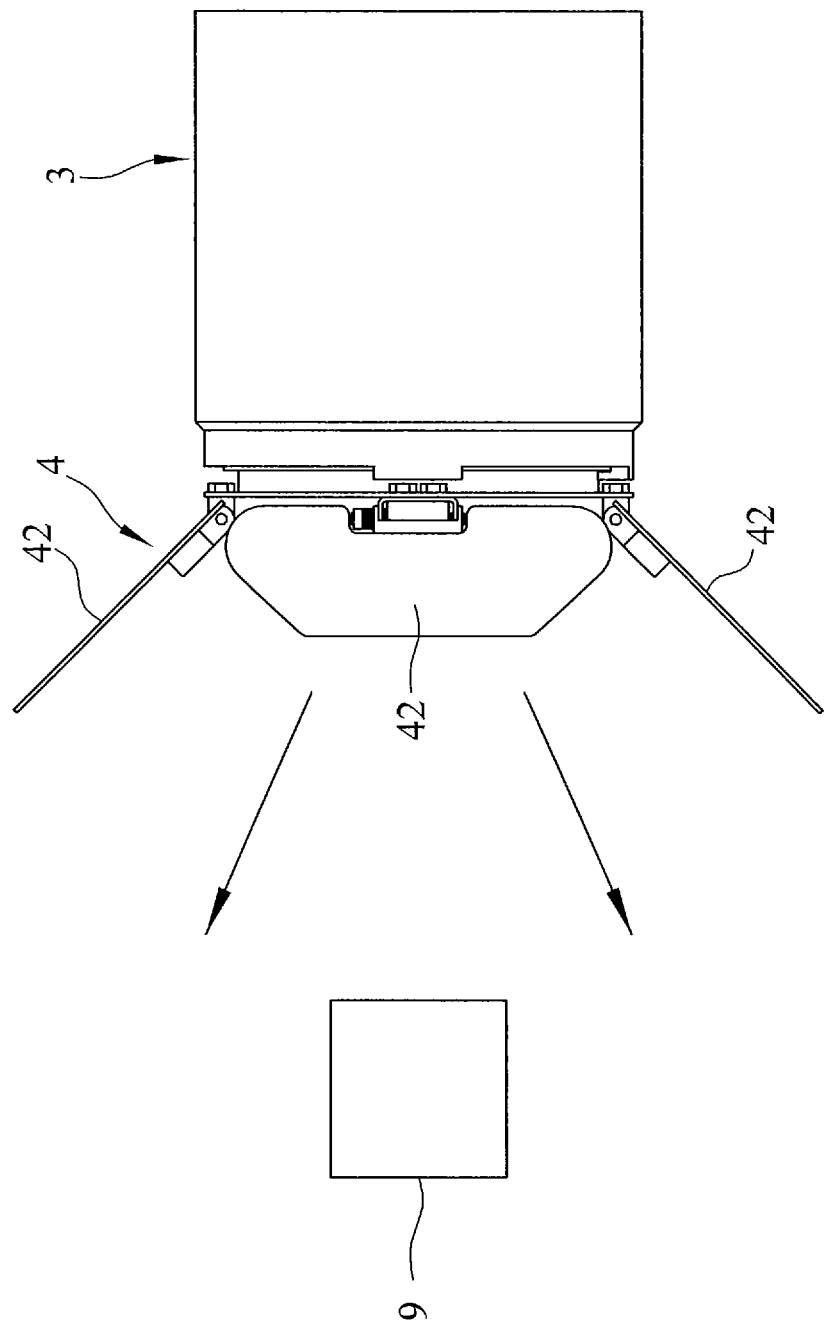
FIG. 13 is a schematic side view of the preferred embodiment, illustrating the lighting device illuminating the object to provide illumination area (A) in FIG. 12.
Figure 14:
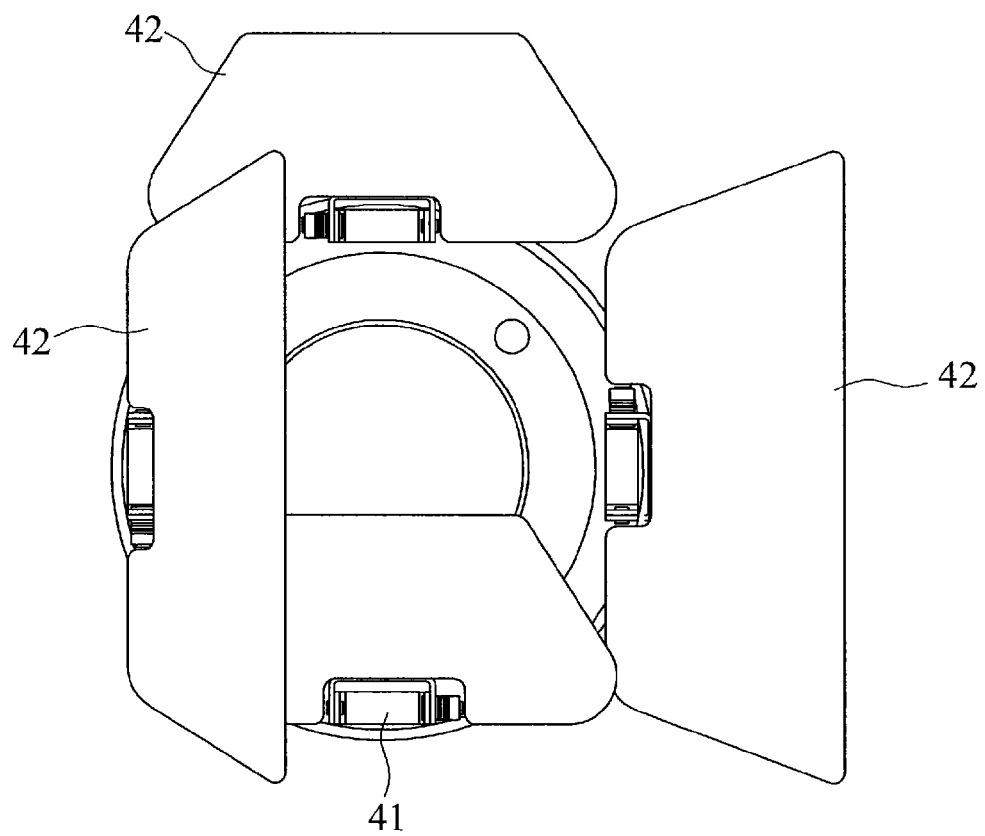
FIG. 14 is a front view of the preferred embodiment, illustrating shade components of the shade device being pivoted relative to the lighting device to provide illumination area (B) in FIG. 12.
Figure 15:
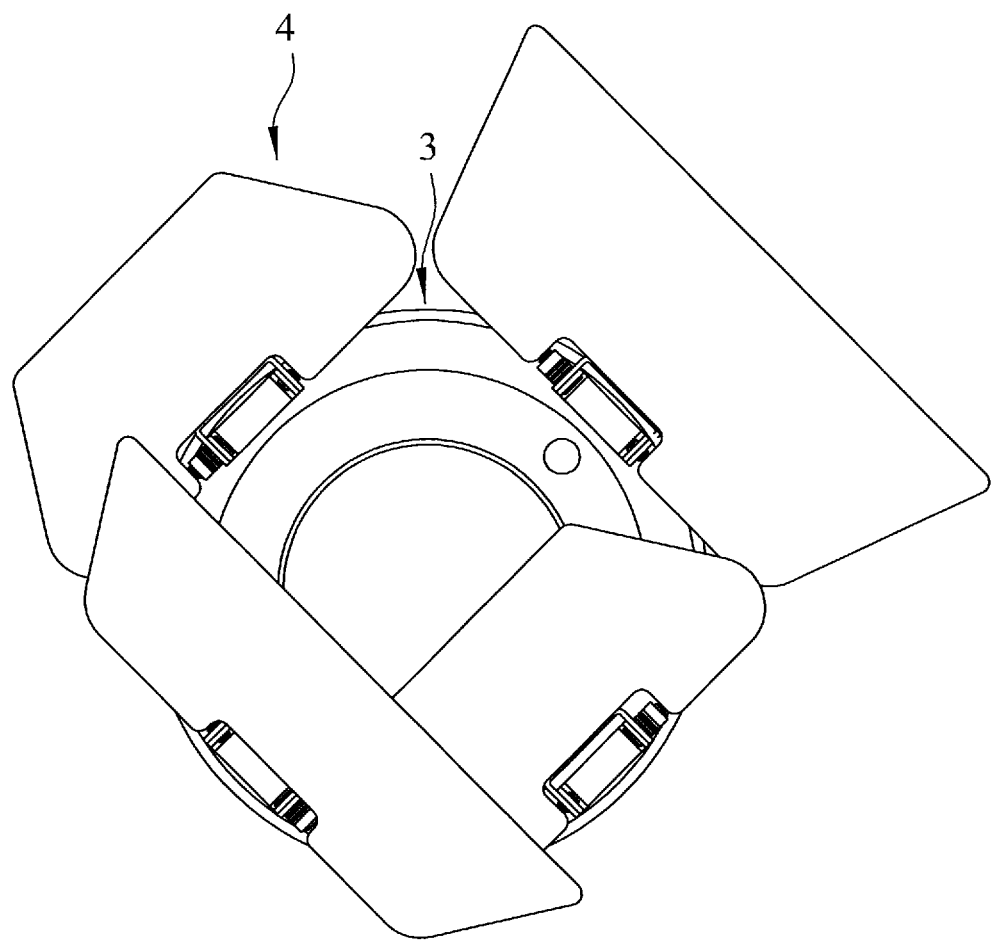
FIG. 15 is another front view of the preferred embodiment, illustrating the shade components of FIG. 14 that are further rotated relative to the lighting device to provide illumination area (C) in FIG. 12.

The illumination area of the lighting device 3 on the object 9, referring to FIG. 12, can be adjusted by rotating the shade device 4 relative to the lighting device 3 or pivoting the shade components 42 relative to the base mount 41. When the shade components 42 are arranged in a configuration shown in FIG. 13, the lighting device 3 has an illumination area (A) shown in FIG. 12. Referring to FIG. 14, when two of the shade components 42 are pivoted relative to the base mount 41, the lighting device 3 has an illumination area (B) shown in FIG. 12. As shown in FIG. 15, when the shade device 4 is then rotated relative to the lighting device 3, the lighting device 3 has an illumination area (C) shown in FIG. 12.

Figure 16:
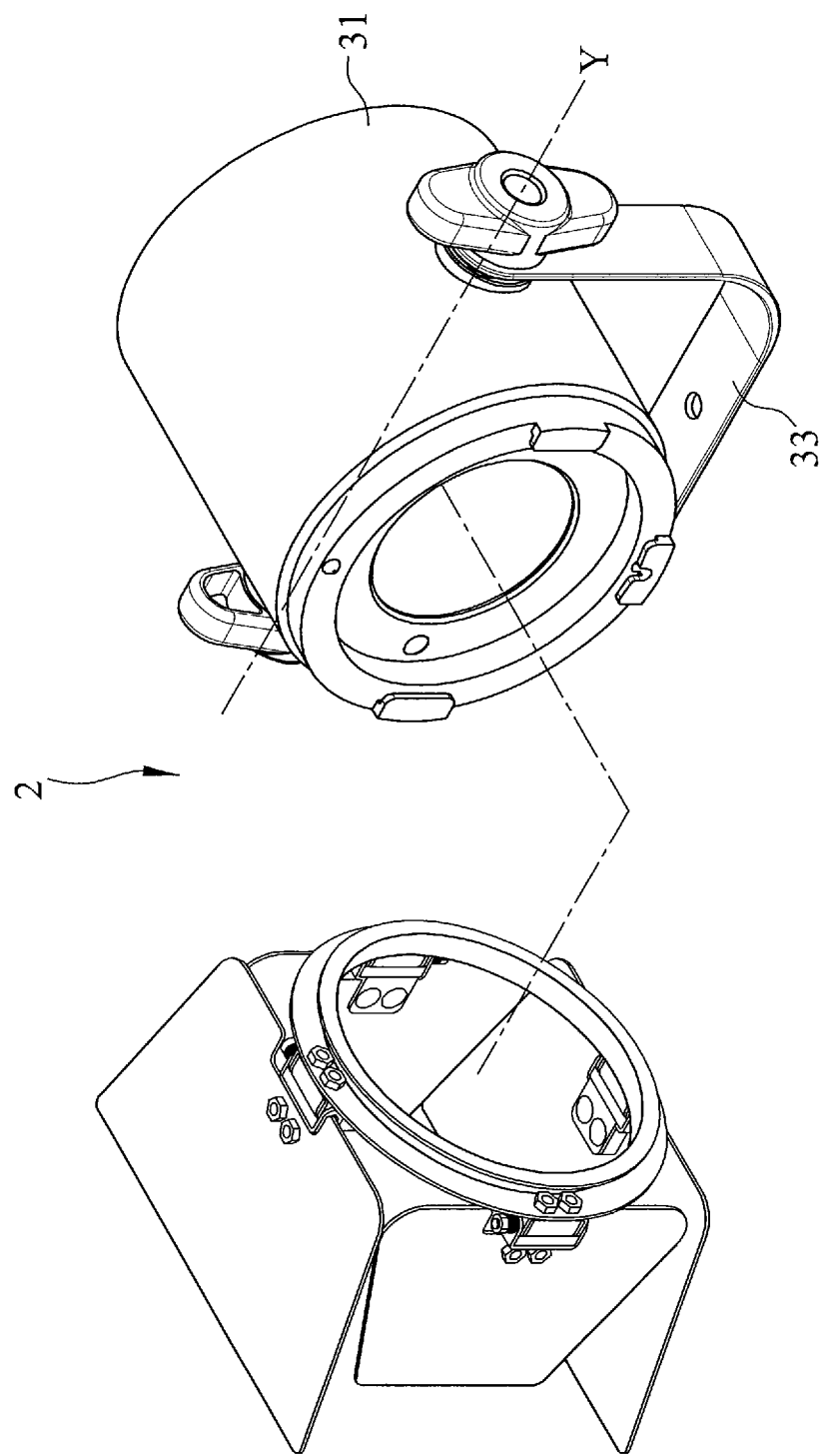
FIG. 16 is a partly exploded perspective view of a modification of the preferred embodiment of the photography lighting fixture according to the present invention, illustrating the lighting device mounted on an angle adjusting member.
Figure 17:
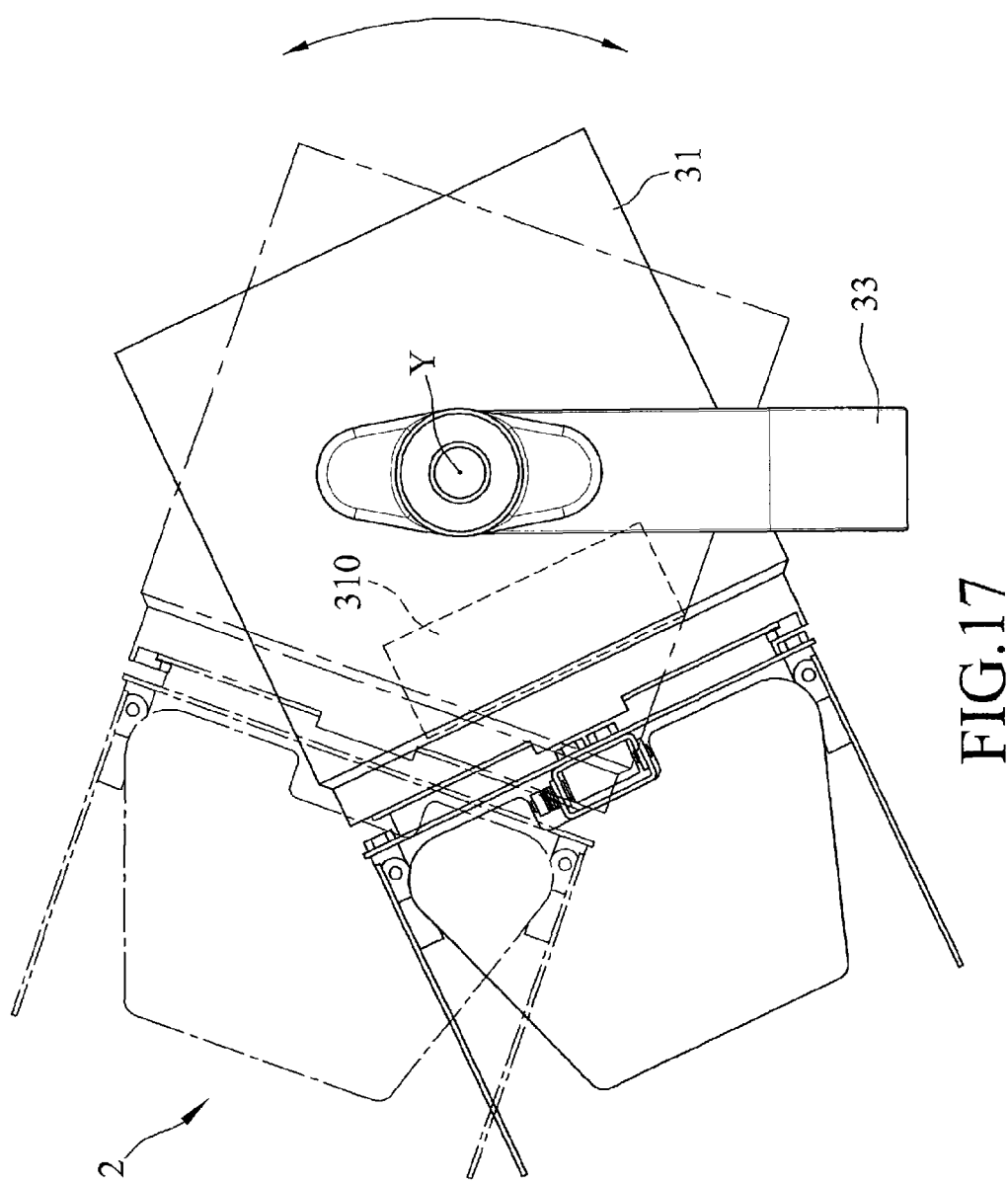
FIG. 17 is a schematic side view of the modification of the preferred embodiment, illustrating the photography lighting fixture being pivotable about a mounting axis of the angle adjusting member.

Referring to FIGS. 16 and 17, a modification of the preferred embodiment of the photography lighting fixture 2 is shown. The photography lighting fixture 2 further comprises an angle adjusting member 33 mounted pivotally to the housing 31. The lighting device 3 is thus pivotable about a mounting axis (Y) perpendicular to the axis (X). By this way, the illumination area of the light emitting element 310 can be further adjusted in a relatively large range as desired.

To sum up, by virtue of the first attaching unit 32 and the second attaching unit 43, it is convenient to replace the shade device 4 by another shade device with a different configuration. Further, since the shade device 4 is rotatable relative to the lighting device 3, the illumination area of the lighting device 3 can be adjusted in a greater extent as compared to the conventional photography lighting fixture 1. Finally, severe damage to the shade components 42 can also be prevented when the photography lighting fixture 2 is subjected to a collision.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A photography lighting fixture comprising:
   a lighting device including a housing, a lighting element disposed in said housing, and a first attaching unit connected to said housing; and
   a shade device including a base mount, a plurality of shade components mounted pivotally to said base mount, and a second attaching unit mounted to said base mount and detachably and rotatably attaching said first attaching unit, said shade components being configured to direct light emitted from said lighting element when said shade device is mounted to said lighting device via said first and second attaching units, wherein:
   said housing surrounds an axis;
   said first attaching unit includes an annular main body connected to said housing and surrounding the axis, and a limiting member connected to said main body and cooperating with said main body to define a limiting space therebetween; and
   said second attaching unit includes an engaging ring extending radially and outwardly from a periphery of said base mount, and engaging detachably and rotatably said limiting space.

2. The photography lighting fixture as claimed in claim 1, wherein said first attaching unit includes a plurality of said limiting members cooperating with said main body to define a plurality of said limiting spaces, each of said limiting members having a connecting segment that extends from said main body in the direction of the axis away from said housing, and an extending segment that extends radially and inwardly from said connecting segment and cooperating with said main body to define one of said limiting spaces.

3. The photography lighting fixture as claimed in claim 1, wherein:
   said main body is formed with a receiving hole extending in the direction of the axis;
   said first attaching unit further includes a positioning member that includes a resilient portion disposed in said receiving hole, and a movable portion connected to said resilient portion and resiliently movable between a limiting position, where said movable portion is biased by said resilient portion to protrude outwardly of said receiving hole for positioning said second attaching unit relative to said first attaching unit, and a retracted position, where said resilient portion is compressed resiliently and said movable portion is retracted into said receiving hole such that said second attaching unit is permitted to be disengaged from said limiting space.

4. The photography lighting fixture as claimed in claim 1, further comprising an angle adjusting member mounted pivotally to said housing.

\* \* \* \* \*